(12) United States Patent
Prabhakar et al.

(10) Patent No.: US 9,977,700 B2
(45) Date of Patent: May 22, 2018

(54) SYSTEM AND METHOD FOR PROVIDING AN APPLICATION PROGRAMMING INTERFACE FOR DEPLOYING A SERVICE BUS ARTIFACT FROM A LOCAL DEVELOPMENT ENVIRONMENT TO A CLOUD ENVIRONMENT

(71) Applicant: Oracle International Corporation, Redwood Shores, CA (US)

(72) Inventors: Kiran Prabhakar, Redwood Shores, CA (US); Dimitri Laloue, Sunnyvale, CA (US); Chad Schoettger, Louisville, CO (US); Antony David, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 119 days.

(21) Appl. No.: 15/088,782

(22) Filed: Apr. 1, 2016

(65) Prior Publication Data
US 2016/0294780 A1 Oct. 6, 2016

Related U.S. Application Data

(60) Provisional application No. 62/142,899, filed on Apr. 3, 2015.

(51) Int. Cl.
G06F 9/54 (2006.01)
H04L 29/08 (2006.01)
H04L 29/06 (2006.01)

(52) U.S. Cl.
CPC .............. *G06F 9/54* (2013.01); *G06F 9/541* (2013.01); *H04L 67/02* (2013.01); *H04L 67/10* (2013.01);
(Continued)

(58) Field of Classification Search
CPC . G06F 9/54; G06F 9/541; H04L 67/02; H04L 67/10; H04L 67/141
See application file for complete search history.

(56) References Cited

U.S. PATENT DOCUMENTS 7,681,203 B2 3/2010 Mandato
9,672,137 B1 6/2017 Allocca
(Continued)

OTHER PUBLICATIONS

Gracia-Tinedo et al., Cloud-as-a-Gift: Effectively Exploiting Personal Cloud Free Accounts via REST APIs, Jul. 2013, IEEE Sixth International Conference on Cloud Computing, pp. 621-628 (Year: 2013).*

(Continued)

*Primary Examiner* — Kenneth W Chang
(74) *Attorney, Agent, or Firm* — Tucker Ellis LLP (57) ABSTRACT

In accordance with an embodiment, described herein is a system and method for deploying a service bus artifact from a local development environment to a service bus instance in a cloud environment. A deployment API can be plugged into the local development environment to perform a plurality of steps required for deploying the service bus artifact, including enabling communication from the local development environment to pass through a corporate firewall. The plurality of steps can be wrapped in a single service call to the service bus instance; and can include creating a session, uploading the service bus artifact, importing the uploaded service bus artifact, executing customization, and activating the session. In the event of a failure of any step, the service call can abort. The deployment API is generic and can be plugged into a plurality of development products.

20 Claims, 6 Drawing Sheets

(52) U.S. Cl.
CPC ............ *H04L 67/141* (2013.01); *H04L 67/34* (2013.01); *H04L 63/029* (2013.01)

(56) References Cited

U.S. PATENT DOCUMENTS

| | | |
|---|---|---|
| 2006/0034237 A1 | 2/2006 | Patrick |
| 2008/0310392 A1* | 12/2008 | Dowling ................. H04L 29/06 370/349 |
| 2011/0131318 A1* | 6/2011 | Maes ................... G06F 11/1482 709/224 |
| 2011/0265164 A1* | 10/2011 | Lucovsky ............ G06F 9/45533 726/7 |
| 2012/0089726 A1* | 4/2012 | Doddavula ............ G06F 9/5072 709/224 |
| 2012/0185821 A1* | 7/2012 | Yaseen ...................... G06F 8/10 717/105 |
| 2012/0239620 A1 | 9/2012 | Masini |
| 2013/0019000 A1 | 1/2013 | Markus |
| 2013/0086204 A1* | 4/2013 | Ghosh .................... G06Q 10/00 709/217 |
| 2014/0075016 A1* | 3/2014 | Chatterjee ........... H04L 41/5041 709/224 |
| 2014/0173594 A1* | 6/2014 | Ng ...................... G06F 9/45533 718/1 |
| 2014/0181306 A1* | 6/2014 | Kothamasu ........... G06F 9/5072 709/226 |
| 2014/0280494 A1 | 9/2014 | Samoylenko |
| 2015/0019735 A1 | 1/2015 | Pogrebinsky |
| 2015/0067013 A1 | 3/2015 | Scoda |
| 2015/0213259 A1 | 7/2015 | Du |
| 2016/0026461 A1 | 1/2016 | Bannister |
| 2016/0088023 A1 | 3/2016 | Handa |
| 2016/0171682 A1 | 6/2016 | Abedini |

OTHER PUBLICATIONS

Joe Zou et al., "From Representational State Transfer to Accountable State Transfer Architecture", 8 pages, 2010.
United States Patent and Trademark Office, Office Action Dated Mar. 28, 2018 for U.S. Appl. No. 15/483,136, 14 pages.

* cited by examiner

Figure 6 ity to U.S.
SYSTEM AND METHOD FOR PROVIDING AN APPLICATION PROGRAMMING INTERFACE FOR DEPLOYING A SERVICE BUS ARTIFACT FROM A LOCAL DEVELOPMENT ENVIRONMENT TO A CLOUD ENVIRONMENT

CLAIM OF PRIORITY

This application claims the benefit of priority to U.S. Provisional Application titled "SYSTEM AND METHOD FOR PROVIDING A REST API FOR DEPLOYING A SERVICE BUS RESOURCE TO A PUBLIC CLOUD", Application No. 62/142,899, filed Apr. 3, 2015, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to service bus systems, and are particularly related to a system and method for providing an application programming interface (API) for deploying a service bus artifact from a local development environment to a service bus runtime in a public cloud environment.

BACKGROUND

In many situations, a service bus application developer may use a local development tool, for example, an interactive development environment (IDE) to develop service bus artifacts, for its many features (for example, refactoring) that are not available in other web-based configuration tools (for example, Oracle Service Bus Console).

With the popularity of a platform as a service, a service bus application developer may use an IDE running in an on-premises environment for development, and also use a service bus instance on a public cloud platform for hosting.

However, a typical IDE may use a deployment feature that does not work with a service bus instance hosted on a public cloud platform. For example, Oracle's JDeveloper uses management beans for deployment, and the management bean can be prevented by a corporate proxy/firewall configuration.

SUMMARY

In accordance with an embodiment, described herein is a system and method for deploying a service bus artifact from a local development environment to a service bus instance in a public cloud environment. A deployment API can be plugged into the local development environment to perform a plurality of steps required for deploying the service bus artifact, including enabling communication from the local development environment to pass through a corporate firewall. The plurality of steps can be wrapped in a single service call to the service bus instance; and can include creating a session, uploading the service bus artifact, importing the uploaded service bus artifact, executing customization, and activating the session. In the event of a failure of any step, the service call can abort. The deployment API is generic and can be plugged into a plurality of development products.

DETAILED DESCRIPTION

A service bus system, for example Oracle Service Bus (OSB), provides a neutral container in which business functions may connect service consumers and back-end business services, regardless of underlying infrastructure. A runtime of a service bus system can be provisioned as a service on a multi-tenant application server in a public cloud environment.

While a service bus instance in a cloud platform can offer many benefits for an enterprise, for example flexibility and cost saving, it also can create some challenges in terms of deployment, particularly from a local development environment behind an enterprise firewall.

In accordance with an embodiment, described herein is a system and method for deploying a service bus artifact from a local development environment to a service bus instance in a public cloud environment. A deployment API can be plugged into the local development environment to perform a plurality of steps required for deploying the service bus artifact, including enabling communication from the local development environment to pass through a corporate firewall. The plurality of steps can be wrapped in a single service call to the service bus instance; and can include creating a session, uploading the service bus artifact, importing the uploaded service bus artifact, executing customization, and activating the session. In the event of a failure of any step, the service call can abort. The deployment API is generic and can be plugged into a plurality of development products.

Service Bus Runtime

Figure 1:
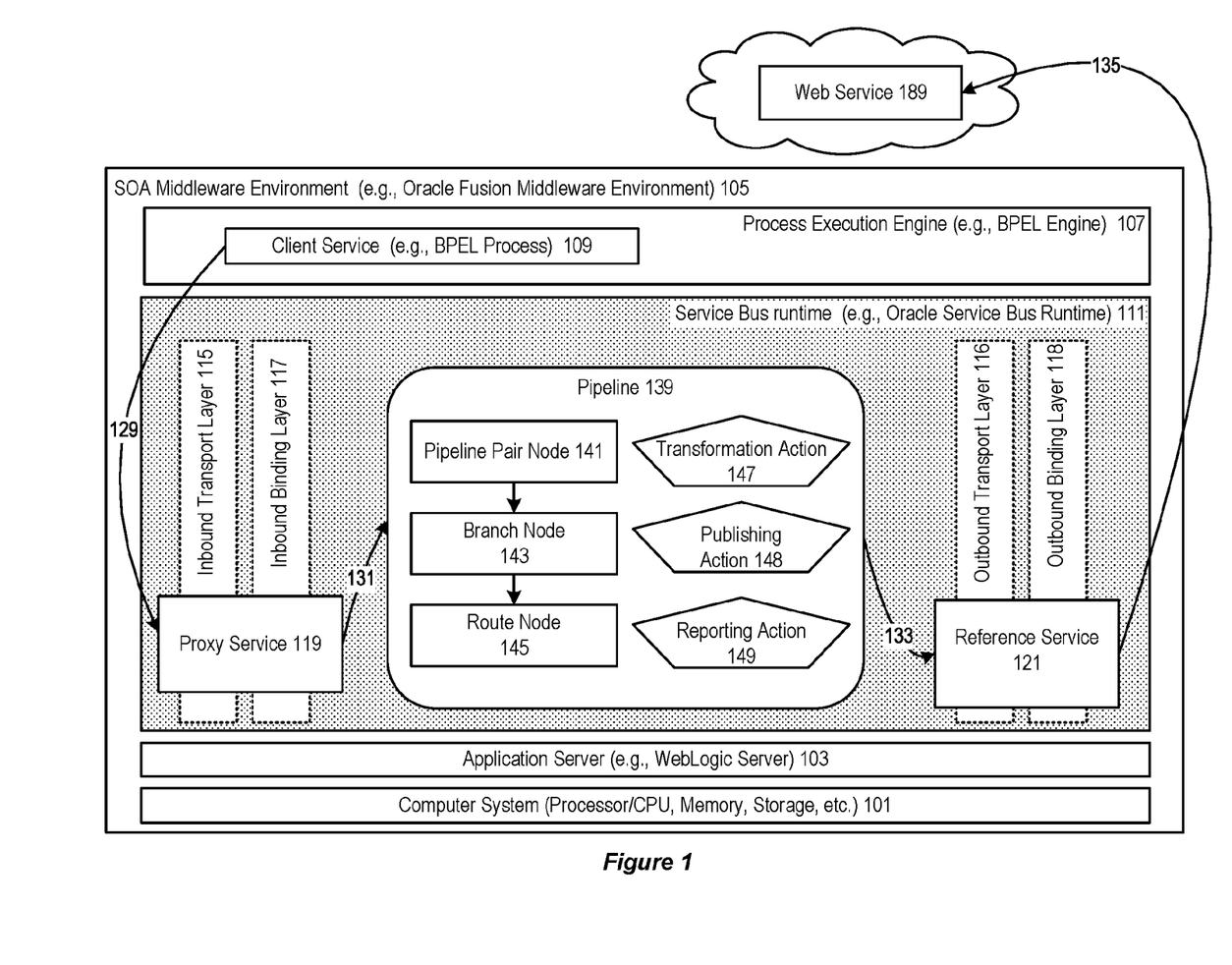
FIG. 1 illustrates a service bus runtime, in accordance with an embodiment.

FIG. 1 illustrates a service bus runtime, in accordance with an embodiment.

As shown in FIG. 1, a service bus runtime (for example, an Oracle Service Bus runtime) 111 can be provided as a software component within a service-oriented architecture (SOA) middleware environment (for example, an Oracle Fusion middleware environment) 105 which executes on an application server (for example, WebLogic Server) 103 on a computer 101 including memory and microprocessors.

In accordance with an embodiment, the service bus runtime can include one or more proxy services (for example proxy service 119), and one or more reference services (for example, reference service 121).

As used herein, in accordance with an embodiment, a proxy service represents a service bus definition of an intermediary web service hosted locally in the service bus runtime. A proxy service's configuration can include its interface, the type and configuration of the transport it uses to connect with a client service, security requirements, and service level agreement (SLA) alert rules.

In accordance with an embodiment, the implementation of a proxy service can be defined by a message flow, which can include a plurality of components to define a logic for routing and manipulating messages as they flow through the proxy service. The message processing logic in a message flow can be defined by a pipeline. A pipeline represents a sequence of user-configured processing steps (stages) for a message. Each stage can be a pipeline element, and can include one or more actions that define the handling of messages as the messages flow through a proxy service at runtime. A pipeline can also be associated with a plurality of nodes configured to route messages through the pipeline.

As shown in FIG. 1, a pipeline 139 can include a pipeline pair node 141, a branch node 143 and a route node 145. The pipeline pair node can tie together a single request and a single response pipeline into one top-level element. The branch node enables message processing to proceed down one of several possible paths by comparing values in a table of string values with a value in a message. The route node can define destinations for messages, and can perform request and response communication with another service. A plurality of actions (for example, transformation action 147, publishing action 148, and reporting action 149) can be associated with the pipeline to implement a processing logic for the messages.

As used herein, in accordance with an embodiment, reference services can be a service bus definition of an external service to which the service bus runtime is a client, and can be used to define access to the external service.

For example, the reference service shown in FIG. 1 can define how to access 135 an external web service 189, and can specify an endpoint URI/location and interface of the external web service.

In accordance with an embodiment, the service bus runtime can include an inbound transport layer 115 and an outbound transport layer 116, and an inbound binding layer 117 and an outbound binding layer 118. The inbound transport layer is a communication layer between a client service and the service bus runtime, and acts as the entry point for messages into the service bus runtime. It can handle raw bytes of message data in the form of input/output streams, including returning response messages to a client service and handling meta-data for messages, including endpoint URIs and transport headers. The inbound transport layer can support a plurality of transport protocols, including HTTP(S), JMS, FTP, File, and E-mail. Similarly, the outbound transport layer handles communication between external services and the service bus runtime, and supports the plurality of transport protocols as described above.

In accordance with an embodiment, the inbound binding layer and the outbound binding layer can pack and unpack messages as necessary, handle messages security, and hand the messages off to pipelines for processing.

In accordance with an embodiment, the service bus runtime can provide intelligent message brokering between external services (for example, enterprise services and databases) and service clients (for example, presentation applications) through proxy services, which can be developed using an interactive development environment (IDE) (for example, Oracle JDeveloper), or configured using a web-based management console (for example, Oracle service bus console). The service bus runtime can enable client services to exchange messages with an intermediary proxy service, rather than directly with a reference service. Since a proxy service can be independently implemented and dynamically configured, as driven by business needs, the service bus runtime can route messages between different types of services, without requiring costly infrastructure development and re-deployment efforts.

In the exemplary service bus runtime as shown in FIG. 1, the proxy service can receive 129 a message from a client service 109 in a process execution engine 107, and pass 131 the message to the pipeline which can transform data of the message into a format required by the reference service. The proxy service can receive 133 the message from the reference service, and send the message to the external web service in the cloud. The process execution engine can be a business process language execution (BPEL) engine, and the client service can be a BPEL process instance executing on the process execution engine.

In accordance with an embodiment, a message routed through the service bus runtime can be associated with a message context defined by an XML schema. The message context can include a set of properties (context variables) holding content of the message and information for the message. The message context variables can be accessed and manipulated using, for example XQuery expressions, in actions in pipeline stages. The context variables can include a header, a body and an attachment which can be initialized using the message content received by a proxy service. The message content in the context variables can be used to construct outgoing messages routed or published to other services.

In accordance with an embodiment, a proxy service or reference service can be implemented using Simple Object Access Protocol (SOAP) and defined by a web service definition language (WSDL) file, or representational state transfer (REST) architectural style.

REST represents an architectural style that specifies a plurality of architecture constraints (for example, decoupling consumer services from producer services, stateless existence, and uniform interface). A REST-based service (REST service) typically uses HTTP as its underlying protocol and uses HTTP requests to post data, get data, and delete data. A REST service can be associated with a web application description language (WADL) document that describes and defines the REST service.

In accordance with an embodiment, the service bus runtime can include a virtualization layer to support REST services, which can invoke, or be invoked by, a WSDL-based pipeline. A REST proxy service can convert a payload of a REST native format, for example JavaScript Notation (JSON) format, to SOAP format before invoking a pipeline, while a REST reference services can be invoked by a pipeline, and can convert the payload from SOAP to a REST native format.

Deployment to a Service Bus Instance in a Public Cloud Environment

Compared to a web-based service management console, an interactive development environment (IDE) in an on-premises environment can be preferable to a developer for its offer additional features (for example, refactoring).

However, deployment from the on-premises environment to a service bus instance hosted in a public cloud environment may face additional challenges.

For example, an IDE such as JDeveloper can use management beans for deployment, and the management beans may be prevented by a corporate proxy/firewall configuration between the IDE and a public cloud environment.

Further, an IDE in an on-premises environment can be configured to deploy service artifacts to a local service bus runtime used by a developer alone. A public cloud environment, however, can be multi-tenant, and can offer a service bus runtime as a service that can be accessed by more than one user associated with a particular tenant. As such, configuration files of the service can potentially be modified by multiple users at the same time during deployment.

In accordance with an embodiment, described herein is a system and method for deploying a service bus artifact from a local development environment to a service bus instance in a public cloud environment. A deployment API can be plugged into the local development environment to perform a plurality of steps required for deploying the service bus artifact, including enabling communication from the local development environment to pass through a corporate firewall. The plurality of steps can be wrapped in a single service call to the service bus instance; and can include creating a session, uploading the service bus artifact, importing the uploaded service bus artifact, executing customization, and activating the session. In the event of a failure of any step, the service call can abort. The deployment API is generic and can be plugged into a plurality of development products.

In accordance with an embodiment, by wrapping the steps needed for deployment into a single API and making the API dynamically pluggable to a plurality of development products, the service bus instance in the public cloud environment can secure one deployment API regardless which development tools/products uses the deployment API to deploy a service bus artifact to the service bus instance.

In accordance with an embodiment, techniques such as verb tunneling can be used can be used to pass a corporate firewall that can block any other HTTP operations than GET and POST.

In accordance with an embodiment, the deployment API can be implemented asynchronously, to return a call back reference for use by an API client to query information in a response later. This implementation can be useful when the payload size of a request may result in calls spanning a duration longer than acceptable for the API client.

Figure 2:
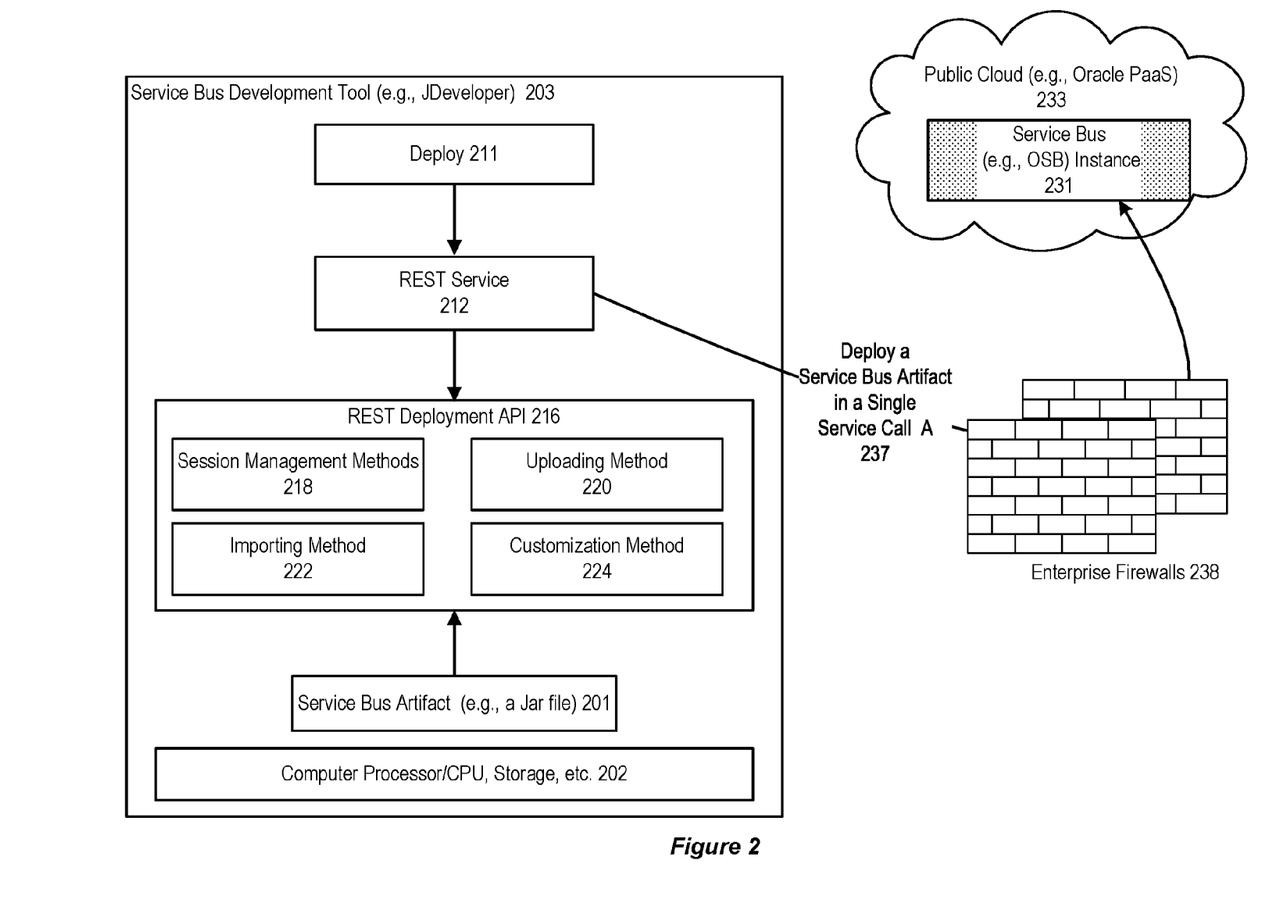
FIG. 2 illustrates a system for providing a deployment API for use in deploying a service bus artifact from a local development environment to a public cloud environment, in accordance with an embodiment.

FIG. 2 illustrates a system for providing a deployment API for use in deploying a service bus artifact from a local development environment to a public cloud environment, in accordance with an embodiment.

As shown in FIG. 2, a service bus development tool (e.g., JDeveloper) 203 on a computer 202 in an on-premises environment can be used to develop a service bus artifact (for example, service bus deployment resources) 201.

In accordance with an embodiment, a deployment action (for example, a "run" or "deploy" menu) 211 on the development tool, when invoked by a user, can call a REST service 212, which can initialize a single service call (for example, service call A) 237 to deploy the service bus artifact to the service bus instance 231 in a public cloud environment 233.

As further shown in FIG. 2, the REST service can invoke a deployment API 1316 to perform the deployment, including enabling communication with the service bus instance in the pubic cloud through enterprise firewalls 238.

In accordance with an embodiment, the deployment API can include a plurality of methods (for example, a plurality of session management methods 1318, an uploading method 1320, an importing method 222, and a customization method 224).

In accordance with an embodiment, during the single service call, the plurality of steps can be performed on the service bus instance in the public cloud. First, a session can be created using an input string, to provide multiple levels of undo, and visibility into potential configuration conflicts.

Next, the contents of a service bus artifact can be uploaded, and imported to the service bus instance according to a plurality of parameters passed.

In accordance with an embodiment, the REST service can additionally perform configuration customizations during the single service call. Once each of the above-described steps is completed successfully, the REST service can activate the session to enable the deployed service bus artifact in the service bus instance in the public cloud environment.

In the event of a failure of any step, the service call can terminate, and return errors or details of conflicts; and the session can be discarded.

Figure 3:
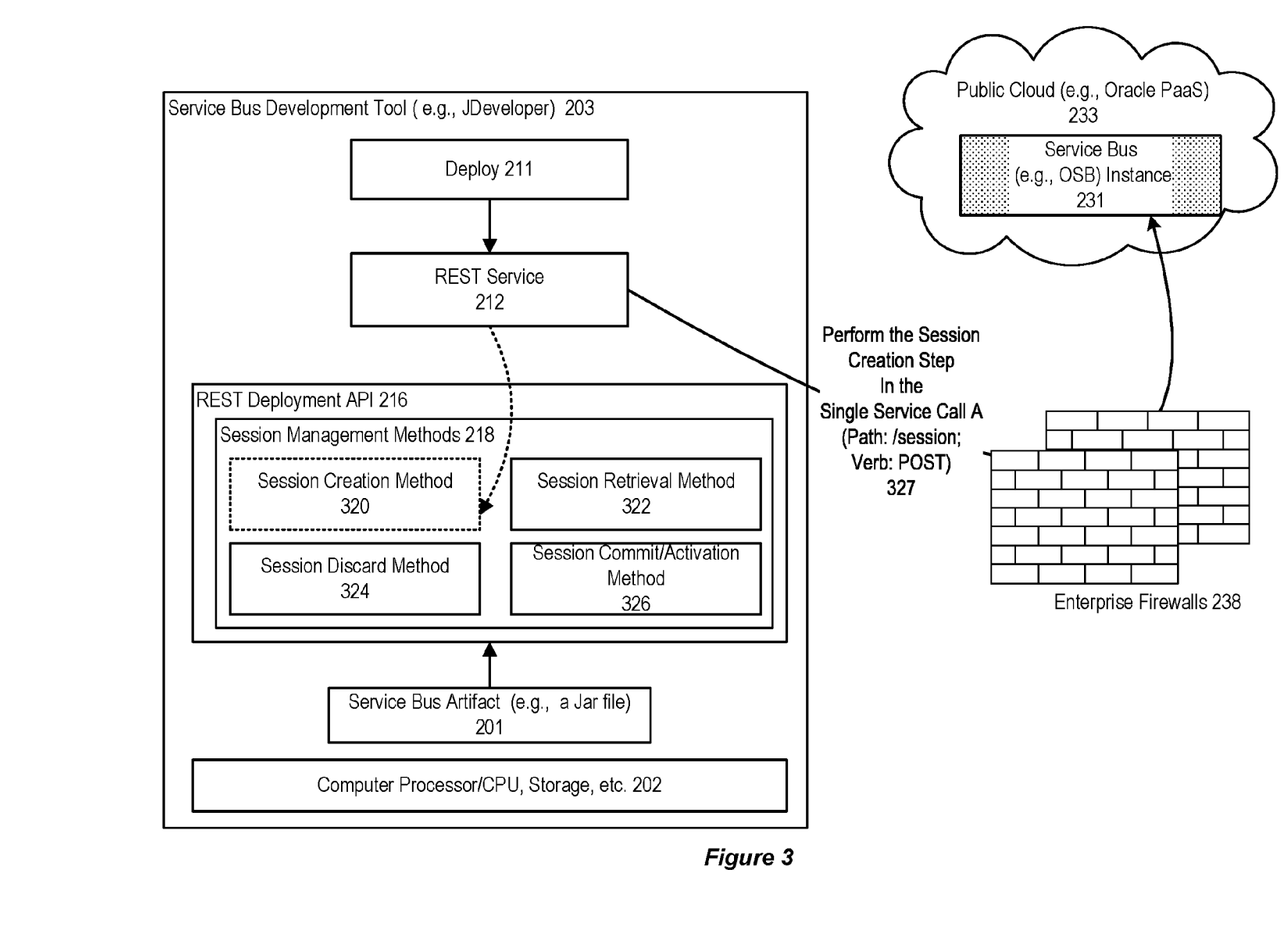
FIG. 3 further illustrates a system for providing a deployment API for use in deploying a service bus artifact from a local development environment to a public cloud environment, in accordance with an embodiment.

FIG. 3 further illustrates a system for providing a deployment API for use in deploying a service bus artifact from a local development environment to a public cloud environment, in accordance with an embodiment.

As shown in FIG. 3, the plurality of session management methods in the deployment API can further include a session creation method 320, a session retrieval method 1422, a session discard method 324, and a session commit/activation method 326.

In accordance with an embodiment, the plurality of session management methods can support the session management functionality at a granular level. Each method can be REST-based, and can include an HTTP verb, and a common relative URL indicating a resource in the service bus instance that each method can perform an operation on.

For example, the session creation method can include the HTTP verb "POST" and the relative URL "/session", which indicates that the action "POST" can be performed on the resource "session". Similarly, the session retrieval method can include the HTTP verb "GET", the session discard method can include the HTTP verb "DELETE", and the session commit/activation method can include the HTTP verb "PUT".

As an illustrative example, the REST service, in the single service call, can invoke the session creation method to perform 327 the session creation step required for deployment to the service bus instance in the public cloud.

Figure 4:
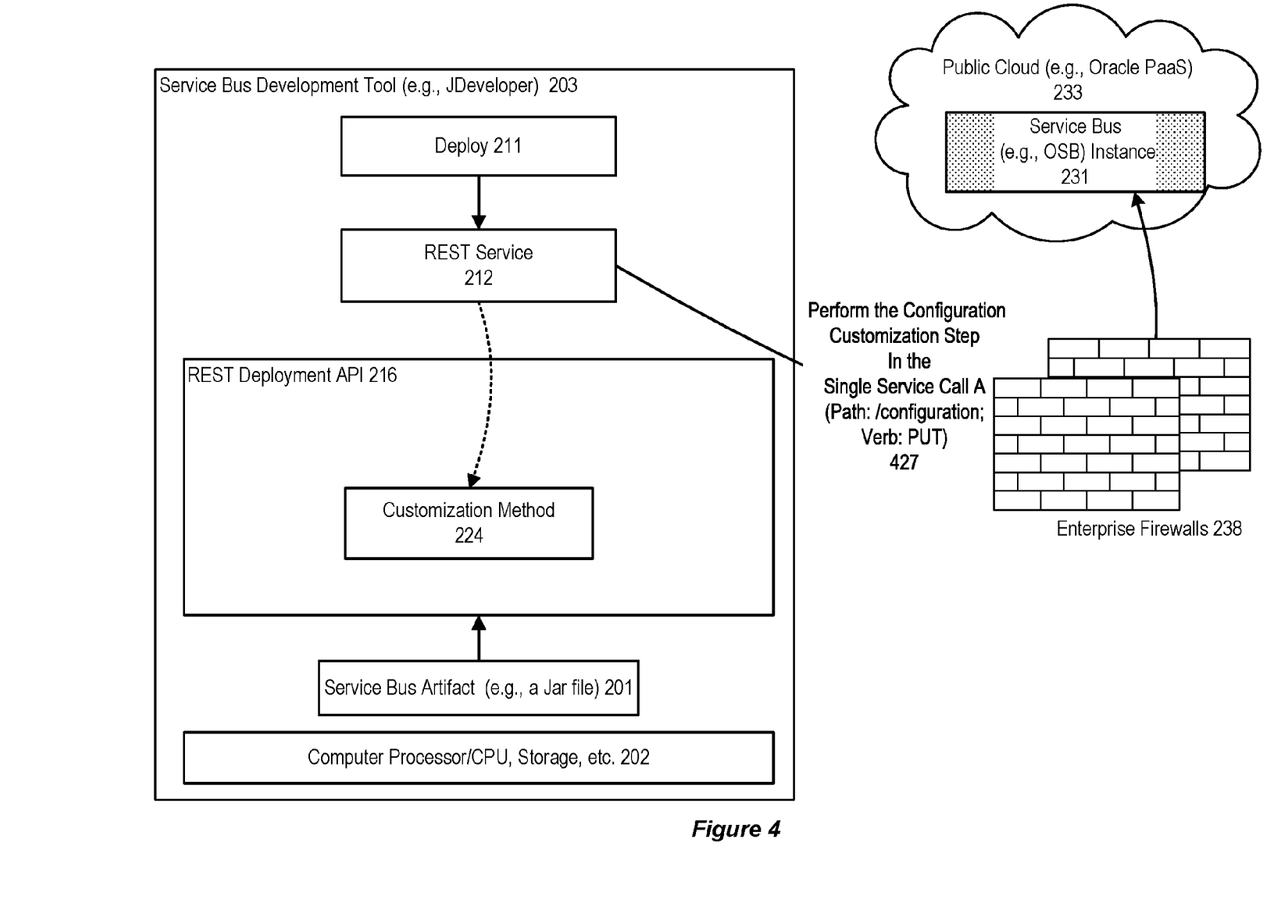
FIG. 4 further illustrates a system for providing a deployment API for use in deploying a service bus artifact from a local development environment to a public cloud environment, in accordance with an embodiment.

FIG. 4 further illustrates a system for providing a deployment API for use in deploying a service bus artifact from a local development environment to a public cloud environment, in accordance with an embodiment.

As shown in FIG. 4, the REST service can invoke the customization method to perform 427 the configuration customization step on the service bus instance during the single service call.

In accordance with an embodiment, a plurality of parameters can be passed with this method in an HTTP request. For example, the parameters can include a "configuration- Resource" parameter, indicating a binary bundle of configuration resources to deploy; an "envValueToPreserve" parameter, indicating environment values within a resource to be preserved during the importing step; a "customization" parameter, indicating customizations such as Assign, Find and Replace environment values, or reference mapping.

Figure 5:
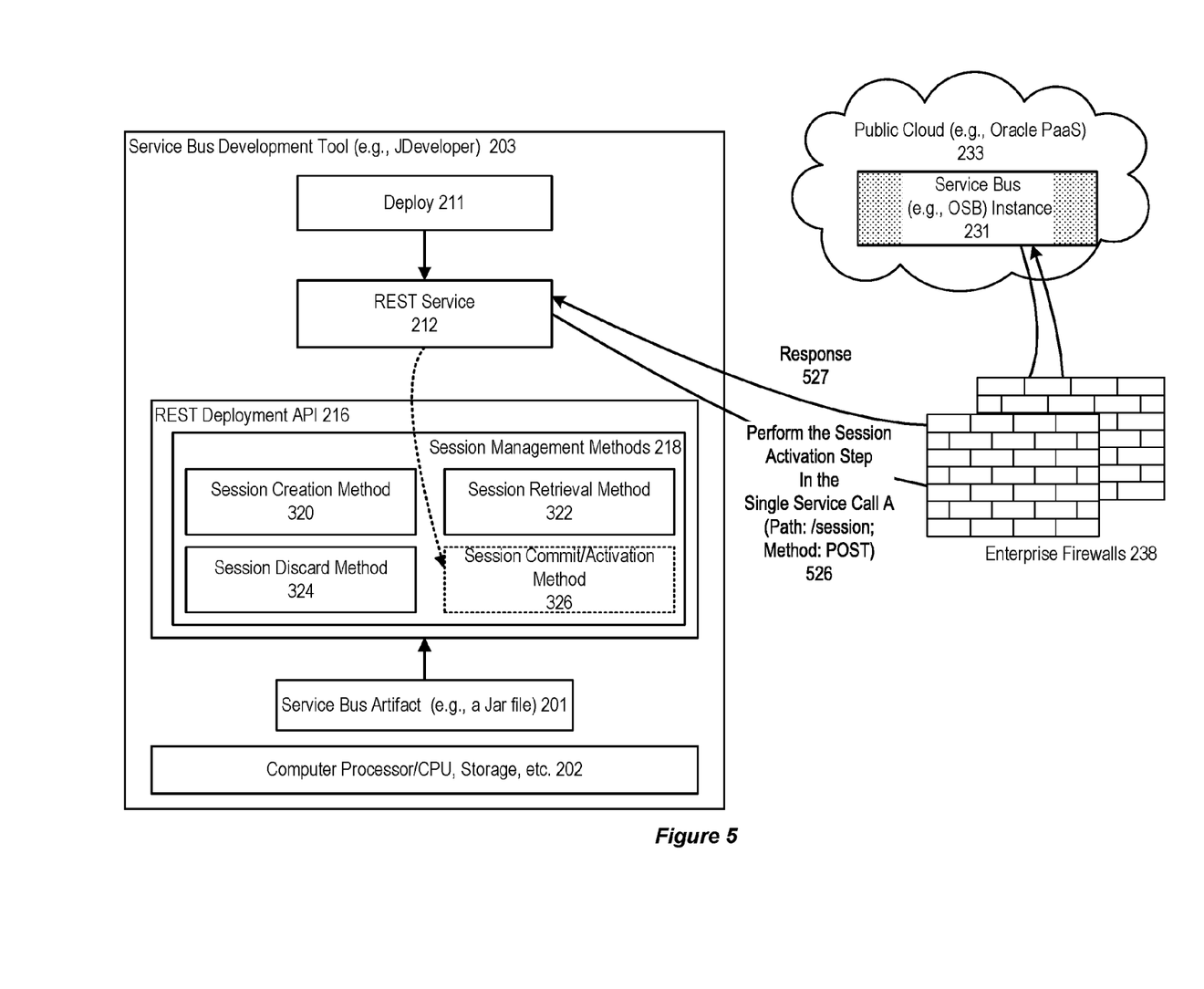
FIG. 5 further illustrates a system for providing a deployment API for use in deploying a service bus artifact from a local development environment to a public cloud environment, in accordance with an embodiment.

FIG. 5 further illustrates a system for providing a deployment API for use in deploying a service bus artifact from a local development environment to a public cloud environment, in accordance with an embodiment.

As shown in FIG. 5, the service call can perform 526 the session activation step, after the steps of creating the session, uploading the service bus artifact, importing the service bus artifact, and customizing the configurations of the service bus instance, are successfully completed.

In accordance with an embodiment, the session activation step can activate the service bus artifact in service bus instance in the public cloud environment.

As further shown in FIG. 5, in response to the session activation step of the service call initiated with a request (for example, an HTTP request), the service bus instance, which can be executing in a multi-tenancy application server, can return a response (for example, an HTTP response) 527 that can include a customization status, a session activation status, conflicts during the session activation, or error messages.

Exemplary Service Call to a Service Bus Instance Using the Deployment API

In an accordance with an embodiment, an illustration of how the deployment API can be used to call a service bus instance is shown below.

```
URL: http://localhost:7021/osb/administration/12/1.4/configResoures
POST Data:
{
    "jarFileContent" : "UEsDBBQACAAIAAuFCZoA=...",
    "envValuesToPreserve" : [ ],
    "passphrase" : "some-passphrase",
    refToImport: [ ],
    "includeDep" : truc,
}
```

In accordance with an embodiment, a request using the deployment API can also be made using a Jersey client API, as shown below:

```
ClientConfig config = new DefaultClientConfig( );
Client = Client.create(config);
client.addFilter(new HTTPBasicAuthFilter("weblogic", "welcome1"));
WebResource service = client.resource(UriBuidler.fromUri
    http://localhost:7021/osb").build( )).path("administration").path(
    version).path("configResources");
JSONObject importData = new JSONObject( );
importData.put("passphrase", "some-passphrase");
importData.put("jarFileContent", encodeFile(fileToUpload));
ClientResponse client_response = service.accept
(MediaType.APPLICATION_JSON)
    .post(ClientResponse.class, importData);
System.out.println("Status: " + client_response.getStatus( ));
client.destroy( );
```

In accordance with an embodiment, a request using the deployment API can include a plurality of parameters as shown in Table 1 below:

TABLE 1

| Name | JSON Variable Type | Description |
|---|---|---|
| refsToImport | Object Array | Reference to the resources/folders/projects to be imported |
| jarFileContent | String | Encoded binary content of a jar file |
| includeDependencies | Boolean | Whether to include dependencies of the resources that are given in the refsToImport parameter which are also in the uploaded jar file |
| envValuesToPreserve | String Array | Environment values inside of a resource to be preserved during an import |
| PassPhrase | String | Base64 encoded passphrase to use to decrypt resources that have been encoded |

Figure 6:
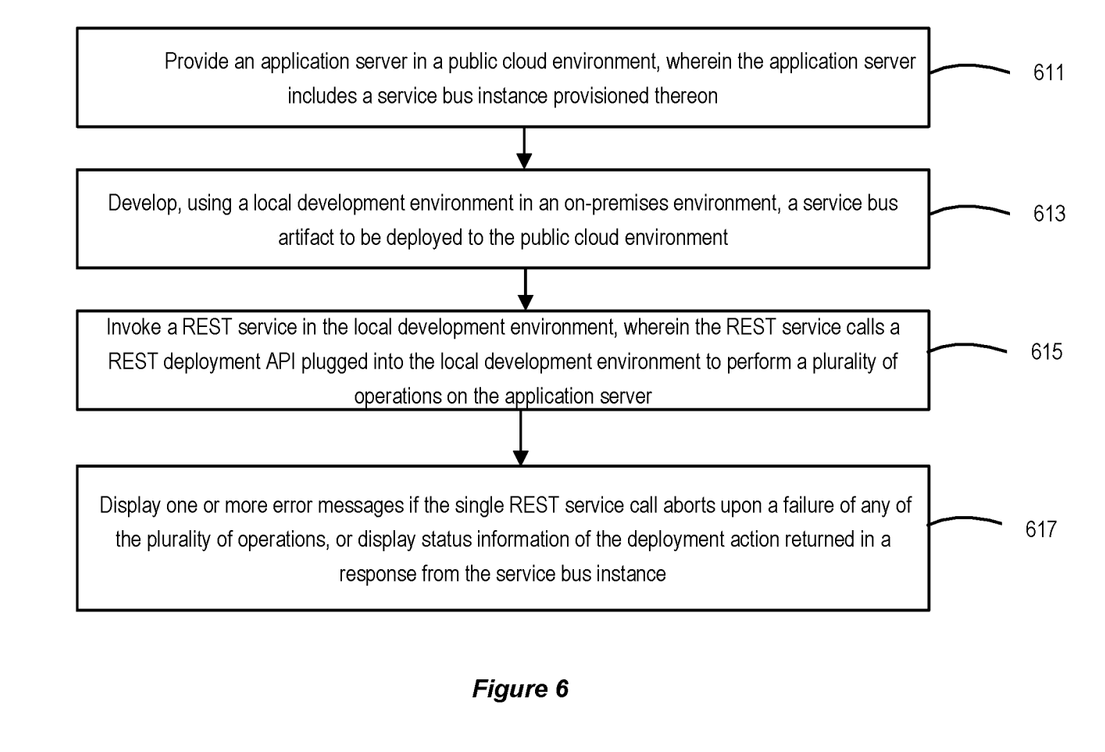
FIG. 6 illustrates a method for providing a deployment API for use in deploying a service bus artifact from a local development environment to a public cloud environment, in accordance with an embodiment.

FIG. 6 illustrates a method for providing a deployment API for use in deploying a service bus artifact from a local development environment to a public cloud environment, in accordance with an embodiment.

As shown in FIG. 6, at step 611, an application server in a public cloud environment can be provided, wherein the application server includes a service bus instance provisioned thereon.

At step 613, a development environment in an on-premises environment can be used to develop a service bus artifact to be deployed to the public cloud environment.

At step 615, a user can invoke a REST service in the local development environment using a deployment action therein, wherein the service calls a deployment API plugged into the local development environment to perform a plurality of operations on the application server, wherein the plurality of operations are wrapped into a single service call to the service bus instance.

At step 617, the local development environment can display one or more error messages if the single service call aborts upon a failure of any of the plurality of operations, or display status information of the deployment action in a response from the service bus instance.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for providing an application programming interface (API) to deploy a service bus artifact from a local development environment to a cloud environment, comprising:
    a computer including one or more microprocessors;
    an application server in a cloud environment, wherein the application server includes a service bus instance provisioned thereon;
    a local development environment for developing a service bus artifact to be deployed to the cloud environment;
    a deployment API in the local development environment, wherein the deployment API operates to perform a plurality of operations on the application server when the deployment API is invoked by a representational state transfer (REST) service in the local development environment;
    wherein the plurality of operations are wrapped into a service call to the service bus instance, and include creating a session, uploading the service bus artifact, importing the uploaded service bus artifact, customizing configurations, and activating the session;
    wherein when each of the plurality of operations is successfully completed, the service bus artifact is deployed and activated for execution in the service bus instance.

2. The system of claim 1, wherein the local development environment is an interactive development environment (IDE) residing behind one or more enterprise firewalls.

3. The system of claim 1, wherein the service bus instance is provisioned as a service, and wherein the cloud environment includes a platform as a service (PaaS) component.

4. The system of claim 1, wherein the service call aborts in the event of a failure of any of the plurality of operations.

5. The system of claim 1, wherein the deployment API is generic and is pluggable to a plurality of different types of development tools.

6. The system of claim 1, wherein the service bus instance, in response to the session being activated, operates to return a response that includes deployment status information to the local development environment.

7. The system of claim 1, wherein the deployment API enables communication from the development environment to pass through a firewall.

8. A method for providing an application programming interface (API) to deploy a service bus artifact from a local development environment to a cloud environment, comprising:
    providing an application server in a cloud environment, wherein the application server includes a service bus instance provisioned thereon;
    developing, using a local development environment in an on-premises environment, a service bus artifact to be deployed to the cloud environment;
    invoking a representational state transfer (REST) service in the local development environment, wherein the REST service invokes a deployment API in the local development environment to perform a plurality of operations on the application server;
    wherein the plurality of operations are wrapped into a service call to the service bus instance, and include creating a session, uploading the service bus artifact, importing the uploaded service bus artifact, customizing configurations, and activating the session; and
    wherein when each of the plurality of operations is successfully completed, the service bus artifact is deployed and activated for execution in the service bus instance.

9. The method of claim 8, wherein the local development environment is an interactive development environment (IDE) residing behind one or more enterprise firewalls.

10. The method of claim 8, wherein the service bus instance is provisioned as a service, and wherein the cloud environment includes a platform as a service (PaaS) component.

11. The method of claim 8, wherein the service call aborts in the event of a failure of any of the plurality of operations.

12. The method of claim 8, wherein the deployment API is generic and is pluggable to a plurality of different types of development tools.

13. The method of claim 8, wherein the service bus instance, in response to the session being activated, operates to return a response that includes deployment status information to the local development environment.

14. The method of claim 8, wherein the deployment API enables communication from the development environment to pass through a firewall.

15. A non-transitory computer-readable storage medium storing a set of instructions for providing an application programming interface (API) to deploy a service bus artifact from a local development environment to a cloud environment, said instructions, when executed by one or more processors, causing the one or more processors to perform steps comprising:
    providing an application server in a cloud environment, wherein the application server includes a service bus instance provisioned thereon;
    developing, using a local development environment in an on-premises environment, a service bus artifact to be deployed to the cloud environment;
    invoking a representational state transfer (REST) service in the local development environment, wherein the REST service invokes a deployment API in the local development environment to perform a plurality of operations on the application server;
    wherein the plurality of operations are wrapped into a service call to the service bus instance, and include creating a session, uploading the service bus artifact, importing the uploaded service bus artifact, customizing configurations, and activating the session; and
    wherein when each of the plurality of operations is successfully completed, the service bus artifact is deployed and activated for execution in the service bus instance.

16. The non-transitory computer-readable storage medium of claim 15, wherein the local development environment is an interactive development environment (IDE) residing behind one or more enterprise firewalls.

17. The non-transitory computer-readable storage medium of claim 15, wherein the service bus instance is provisioned as a service, and wherein the cloud environment includes a platform as a service (PaaS) component.

18. The non-transitory computer-readable storage medium of claim 15, wherein the service call aborts in the event of a failure of any of the plurality of operations.

19. The non-transitory computer-readable storage medium of claim 15, wherein the deployment API is generic and is pluggable to a plurality of different types of development tools.

20. The non-transitory computer-readable storage medium of claim 15, wherein the deployment API enables communication from the development environment to pass through a firewall.

* * * * *